Jan. 31, 1933. E. BURLEY 1,895,702
BIRD BATH
Filed Feb. 11, 1932 2 Sheets-Sheet 1

Inventor
Emmett Burley

By Clarence A. O'Brien
Attorney

Jan. 31, 1933.  E. BURLEY  1,895,702
BIRD BATH
Filed Feb. 11, 1932   2 Sheets-Sheet 2
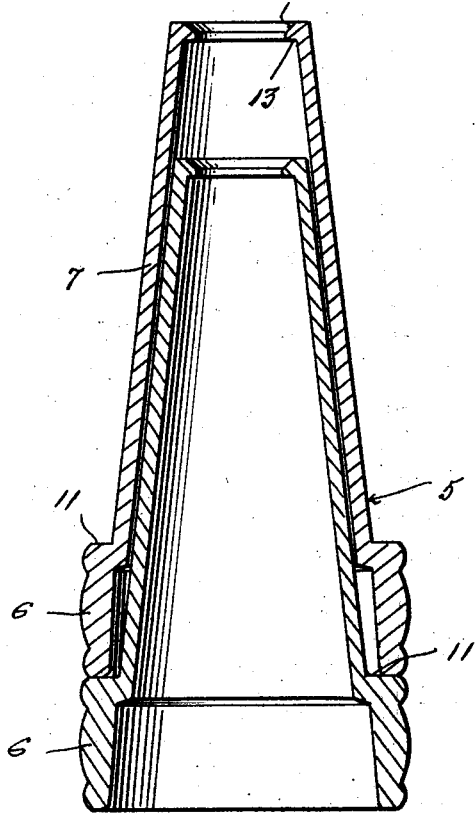
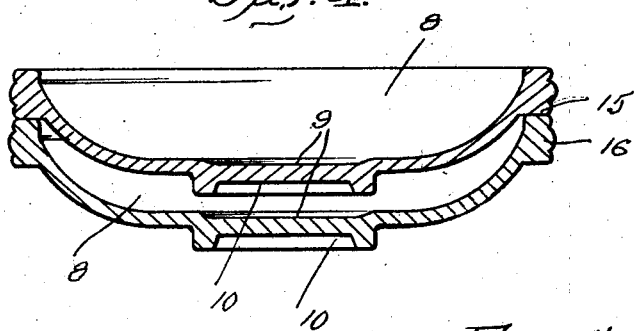
Inventor
Emmett Burley
By Clarence A. O'Brien
Attorney Patented Jan. 31, 1933

1,895,702

UNITED STATES PATENT OFFICE

EMMETT BURLEY, OF ZANESVILLE, OHIO

BIRD BATH

Application filed February 11, 1932. Serial No. 592,405.

This invention relates to certain new and useful improvements in bird baths, and the primary object of this invention is to provide a device of the character above mentioned, which will permit a plurality of the same being stored in a comparatively small space when nested together and which, when also nested together, will permit of a number of baths within reason, of being burned in the kiln.

A still further object of the invention is to provided a bird bath, wherein the stems as well as the bowl or receptacle portions thereof may be respectively nested together as and for the purpose above stated.

Other objects and advantages of the invention will be apparent from a study of the following description, taken in connection with the accompanying drawings wherein:

Figure 3 is a longitudinal transverse sectional view showing two stems arranged in nested or telescopic relation.

Figure 4 is a transverse sectional view showing two bowls or receptacle portions nested or telescoped one with the other.

Figure 1:
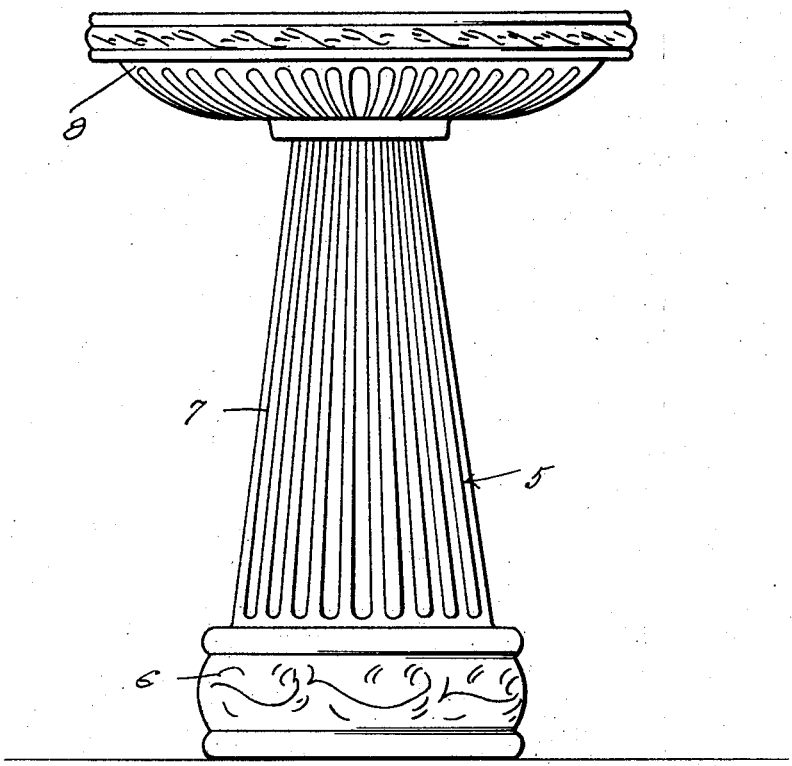
Figure 1 is an elevational view of a bath, the stem and bowl thereof being assembled.

In carrying out the present invention, and as shown in the drawings, the bird bath comprises a stem 5 that is formed of a suitable material and which is hollow throughout its length and open at its upper and lower ends. The stem 5 includes a lower substantially cylindrical portion 6 integral with the largest end of a conical or longitudinally tapered shank or upper portion 7. The outer surfaces of the parts 6 and 7 may be suitably carved or otherwise provided for adding to the ornateness of the bath.

The shank or upper portion 7 of the stem supports on its upper smallest end the bowl or receptacle 8, which latter is suitably ornamented and in many respects is identical with the type of bowl or receptacle used in the present day bird bath.

Figure 2:
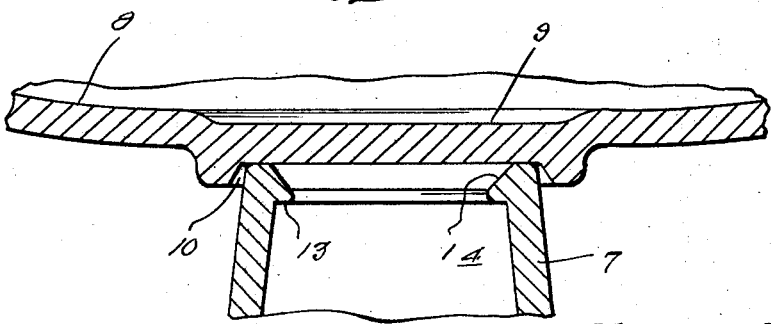
Figure 2 is a fragmentary detail sectional view through the assembled stem and bowl.

However, the bowl 8 of the present invention is characterized by a recess 9 provided in the top surface of the bottom of the bowl, and further in having extending outwardly from the bottom of the bowl a centrally located circular socket 10. The socket 10 receives the uppermost end of the stem, and as shown in Figure 2 the bowl fits firmly on the upper end of the stem with but a minimum possibility of the same being tilted over.

Either for burning purposes while in the kiln, or for storage purposes, two or more of the stems may be nested together, as shown in Figure 3 wherein it will be seen that I have shown one stem telescoped with respect to the other, with the lower edge of the outermost stem resting on the exterior circular shoulder 11 of the innermost stem.

It will be also noted, that the upper portion of the shank 7 of each stem is provided with an inwardly directed annular shoulder 13, the upper face of which is beveled as at 14.

As shown in Figure 4, a plurality of bowls or receptacles 8 may also be nested one with the other either for storage prposes or for placing a plurality of such bowls in the kiln, and when so nested together, it will be seen that the annular shoulder 15 of the upper or innermost bowl rests on the upper edge of the circular bead 16 of the lowermost or outer bowl, and the bowls are of such depths, that the portion of a bowl extending into the outer bowl will be spaced from corresponding walls of the outer bowl so as to provide the necessary clearance for avoiding injury when nesting or separating the bowls.

From the foregoing it will be seen that I have devised a simple and inexpensive yet thoroughly ornate bird bath wherein the stems and also the bowls respectively of a plurality of like bird baths may be readily nested or stacked together so as to require but little storage space and which also further serves in enabling a plurality of stems or bowls to be burned within a single kiln thus conserving time and labor in the manufacture of such baths.

Even though I have herein shown and described the preferred embodiment of the invention, it is to be understood that the same is susceptible of further changes, modifications and improvements coming within the scope of the appended claim.

Having thus described my invention, what I claim as new is:

In a bird bath, in combination, a longitudinally tapered hollow stem provided with an exterior annular shoulder inwardly from the largest end of the stem, a removable bowl provided on the under side of its bottom with a circular socket of a smaller diameter than the bowl fitting the smallest end of said stem, said bowl being also provided adjacent the outer edge thereof with an external annular shoulder; the construction of the stem and bowl respectively being such as to permit a plurality of like stems and bowls being respectively nested one within the other, with the shoulder on one stem abutting the largest end of a second stem when said stems are nested, and the shoulder of an outer bowl abutting the edge of the rim of a second bowl when said bowls are nested together.

In testimony whereof I affix my signature.

EMMETT BURLEY.